United States Patent [19]

Uphadya et al.

[11] Patent Number: 5,949,755

[45] Date of Patent: *Sep. 7, 1999

[54] ATM EMULATED PATH PROTECTION

[75] Inventors: Nagaraja Uphadya, Richardson; Barry Hagglund, Plano; Thi Nguyen, Carrollton, all of Tex.

[73] Assignee: Fujitsu Network Communications, Inc., Richardson, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/631,778

[22] Filed: Apr. 12, 1996

[51] Int. Cl.⁶ ........................................................ H04J 3/14
[52] U.S. Cl. .......................................... 370/224; 370/395
[58] Field of Search ................................... 370/221, 222, 370/223, 224, 395, 396

[56] References Cited

U.S. PATENT DOCUMENTS

| | | | |
|---|---|---|---|
| 4,747,100 | 5/1988 | Roach et al. | 370/86 |
| 5,003,533 | 3/1991 | Watanabe | 370/85.5 |
| 5,251,204 | 10/1993 | Izawa et al. | 370/249 |
| 5,285,446 | 2/1994 | Yonehara | 370/234 |
| 5,285,448 | 2/1994 | Nakayama et al. | 370/216 |
| 5,327,421 | 7/1994 | Hiller et al. | 370/395 |
| 5,341,364 | 8/1994 | Marra et al. | 370/223 |
| 5,343,462 | 8/1994 | Sekitata et al. | 370/13 |
| 5,343,464 | 8/1994 | Iino et al. | 370/227 |
| 5,355,362 | 10/1994 | Gorshe et al. | 370/222 |
| 5,357,508 | 10/1994 | Le Boudec et al. | 370/397 |
| 5,365,524 | 11/1994 | Hiller et al. | 370/376 |
| 5,375,121 | 12/1994 | Nishino et al. | 370/473 |
| 5,406,401 | 4/1995 | Kremer | 370/224 |
| 5,659,540 | 8/1997 | Chen et al. | 370/249 |

*Primary Examiner*—Min Jung
*Attorney, Agent, or Firm*—Staas & Halsey

[57] ABSTRACT

The present invention relates generally to protection of asynchronous transfer mode (ATM) traffic against Synchronous Optical Network (SONET) fiber cuts or other types of transmission media failures in a SONET Ring. The nodes of the Synchronous Optical Network protect the asynchronous transmission mode cells for immediate failures in the Synchronous Optical Network by establishing a table indicating the topology of the nodes in the Synchronous Optical Network. Each node is capable of detecting a loss of header error check synchronization and generating a protection payload data unit, which is egressed to the plurality of nodes. In addition, each node is capable of ingressing protection payload data units from neighboring nodes and for switching the transmission of asynchronous transmission mode cells within the node so that the cells being transmitted in the network are protected. In addition, each node is capable of detecting the restoration of header error check synchronization and capable of switching the transmission of asynchronous cells within the node when header error check synchronization is restored.

34 Claims, 10 Drawing Sheets

ATM EMULATED PATH PROTECTION

BACKGROUND OF THE INVENTION

1. Field of the Invention

The present invention relates generally to discovering neighboring nodes in a network and protection of asynchronous transfer mode (ATM) traffic against Synchronous Optical Network (SONET) fiber cuts or other types of transmission media failures in a SONET Ring.

2. Description of the Related Art

As a result of the expansion in data communication, there is an increasing demand for high quality transmission of various data such as computer data, facsimile data, voice data, animation data, etc. in a communication network. A broadband ISDN (B-ISDN) has been developed and standardized to be used with various interfaces for practical use as a communication network service capable of transmitting data at various speeds by processing collectively in an asynchronous mode both burst information and continuous information.

In the ATM network, data in different bands are contained in a fixed length unit, which is called a "cell". In this system, as data are inserted in cells, various services can be offered where different transmission speeds are required. Thus, the transmission line can be used efficiently. In the ATM communication, user information is divided into a plurality of parts of appropriate length, each being added to a header to form a cell. A header part of each cell includes, for example, a virtual channel identifier (VCI), a virtual path identifier (VPI) and a payload or cell data. The VCI identifies a source user. The user information is typically multiplexed after a cell is generated, and then transmitted or switched to an ATM highway. Cell data are called "self-routing data" because the cell data are transmitted autonomously and indicate the destination or destinations of the cell data.

In the B-ISDN network, a synchronous optical network (SONET) format may be adopted as a transmission apparatus as disclosed in U.S. Pat. No. 5,251,204, wherein a number of ATM cells may be grouped and transmitted in a frame among slots.

Figure 1:
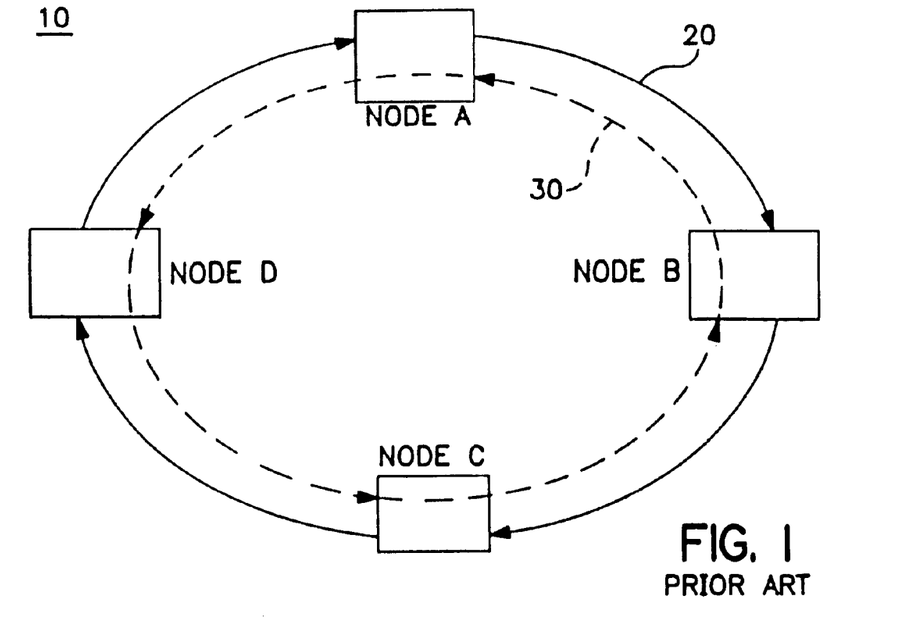
FIG. 1 is a diagram illustrating a prior art SONET.

In FIG. 1, a SONET 10 includes a SONET working ring 20 and a SONET protection ring 30. As shown in FIG. 1, the SONET working ring 20 may, for example, transmit ATM cells or data synchronously in a clockwise direction. The SONET working ring 20 is connected to a plurality of nodes A–D. Each of the nodes A–D may be connected to one or more work stations (not shown). If the SONET working ring 20 made of an optical fiber was cut or another media interruption occurred, due to a hardware failure for example, a node can obtain data from a SONET protection ring 30, which transmits the data in the counterclockwise direction, for example. However, since ATM cells, which are transmitted from one node to another node by way of the SONET working ring 20, may arrive earlier than the ATM cells transmitted by way of the SONET protection ring 30 or vice versa due to the number of intervening nodes and the congestion at each intervening node, it has not been possible to merely switch all of the nodes to accept the ATM cells from the SONET protection ring 30. Therefore, in the prior art ATM cells are unprotected in SONET networks.

A SONET ring network is not the only type of network containing a working path and protection path for transmitting data. There are several types of networks including full mesh, partial mesh, matrix, and hypercube. All of these networks have similar problems in protecting ATM cells.

SUMMARY OF THE INVENTION

Accordingly, it is an object of the present invention to establish the topology of the network and to provide protection of asynchronous transfer mode (ATM) cells against Synchronous Optical Network (SONET) fiber cuts or other types of transmission media failures in a SONET.

The nodes of the synchronous optical network protect the asynchronous transmission mode cells from media failures in the synchronous optical network by establishing a table indicating the topology of the nodes in the synchronous optical network. Each node egresses an originating map payload data unit, having an originating node identifier, to a plurality of neighboring nodes along paths in the protection ring and working ring. The term "egressing" is used to describe the flow of data from a node to the paths in the working ring and protection ring. Each node ingresses neighboring map payload data units having originating node identifiers from other nodes. The term "ingressing" is used to describe the flow of data from the paths of the working ring and protection ring to a node. Each node adds a node identifier to each neighboring payload data unit, wherein the additional node identifier is indicative of the node ingressing from the neighboring map payload data unit. Each node egresses the neighboring payload data unit, which now contains the added node identifier, to a neighboring node. The original payload data unit ingresses to the originating node and the originating node extracts the node identifier for each of the neighboring nodes from the originating map payload data unit. Each node of the present invention generates a table based upon the node identifiers. Connection identifiers are inputted into the node by a user or by hardware, which has the connection identifiers.

A switch table is generated by each node based upon the node identifiers and connection identifiers. The switch table indicates whether data flowing through a channel will pass through the node or will end in the node. Each node is capable of detecting a loss of header error check synchronization and generating a protection payload data unit, which is egressed to the plurality of nodes. In addition, each node is capable of ingressing protection payload data units from neighboring nodes and for switching the transmission of asynchronous transmission mode cells within the node. Each node also detects the restoration of the header error check synchronization and generates a restoration payload data unit. Each node is capable of switching the transmission of asynchronous mode cells within the node when a restoration payload data unit is detected.

The above-mentioned and other objects and features of the present invention will become more apparent from the following description when read in conjunction with the accompanying drawings, in which like reference characters designate the same or similar parts throughout the figures thereof. However, the drawings and description are merely illustrative in nature and not restrictive.

BRIEF DESCRIPTION OF THE DRAWINGS

The accompanying drawings, which are incorporated in and constitute a part of the specification, illustrate embodiments of the invention and, together with the description, serve to explain the principles of the present invention.

DESCRIPTION OF THE PREFERRED EMBODIMENT

Figure 2:
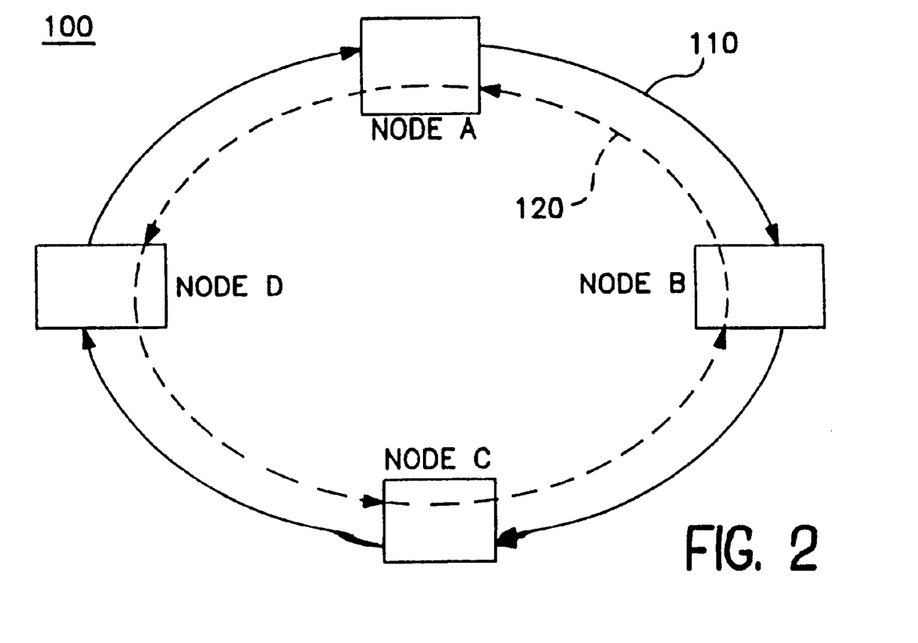
FIG. 2 is a diagram illustrating a SONET of the present invention.

FIG. 2 illustrates an embodiment of a SONET network of the present invention. For simplicity, the present invention will be described by utilizing a SONET ring network. However, the present invention is applicable to other types of networks including a full mesh network, a partial mesh network, a hypercube network and a matrix network.

FIG. 2 shows a SONET 100 with four nodes, node A, node B, node C, and node D in a working SONET ring 110 and a protection SONET ring 120. In order to protect ATM traffic against synchronous optical network fiber cuts or other types of transmission media failures in a network, the topology of the network must be established. First, the designer of the network must select the type of network to be established, e.g. full mesh network, partial mesh network, matrix network, hypercube network, or a ring network. The designer of the network chooses the type of network based upon a customer's requirements. In order to simplify the explanation of the present invention, a ring network is selected.

Figure 3:
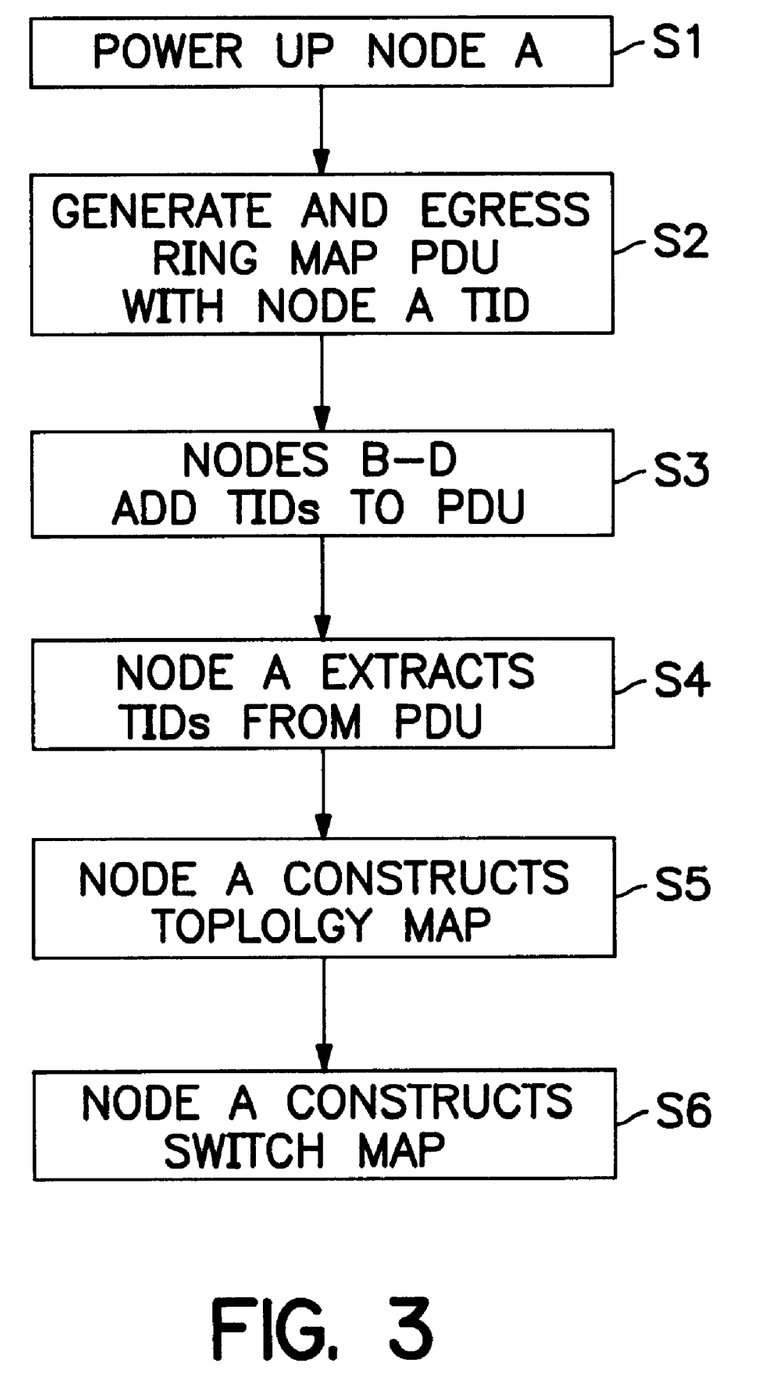
FIG. 3 is a flow chart indicating the steps for forming a topological table or map in the present invention.

Once the type of network is selected, the topology of that network must be established. Each node must determine the connection of the nodes in the network (the neighbors of the node). In node A as shown in FIG. 3, for example, the first step (S1) is to power up the node, the second step (S2) is for node A to egress a ring map PDU (payload data unit). This ring map payload data unit includes a TID (Transport Identifier), which is a label for node A. However, other types of node identifiers or labels may be used instead of the TID. As the ring map payload data unit originating at node A passes through the other nodes in the SONET network, each of the other nodes adds its transport identifier as a label to the ring map payload data unit (S3). Next, the ring map payload data unit ingresses from the SONET network to node A. Then, in step 4 (S4), node A will extract the transport identifiers of its neighboring nodes. In step 5 (S5), node A builds a topology table or topology map, which identifies all the connections among the nodes in the SONET based upon the extraction of the TIDs from the ring map PDU. In step 6 (S6), node A builds a switch table or switch map based upon the topology of the SONET. Each node in the SONET develops a topology table and switch table in a similar manner. This procedure is repeated periodically so that if a new node becomes part of the SONET or an old node is taken away from the SONET, a new topology table and switch table can be generated.

Figure 4:
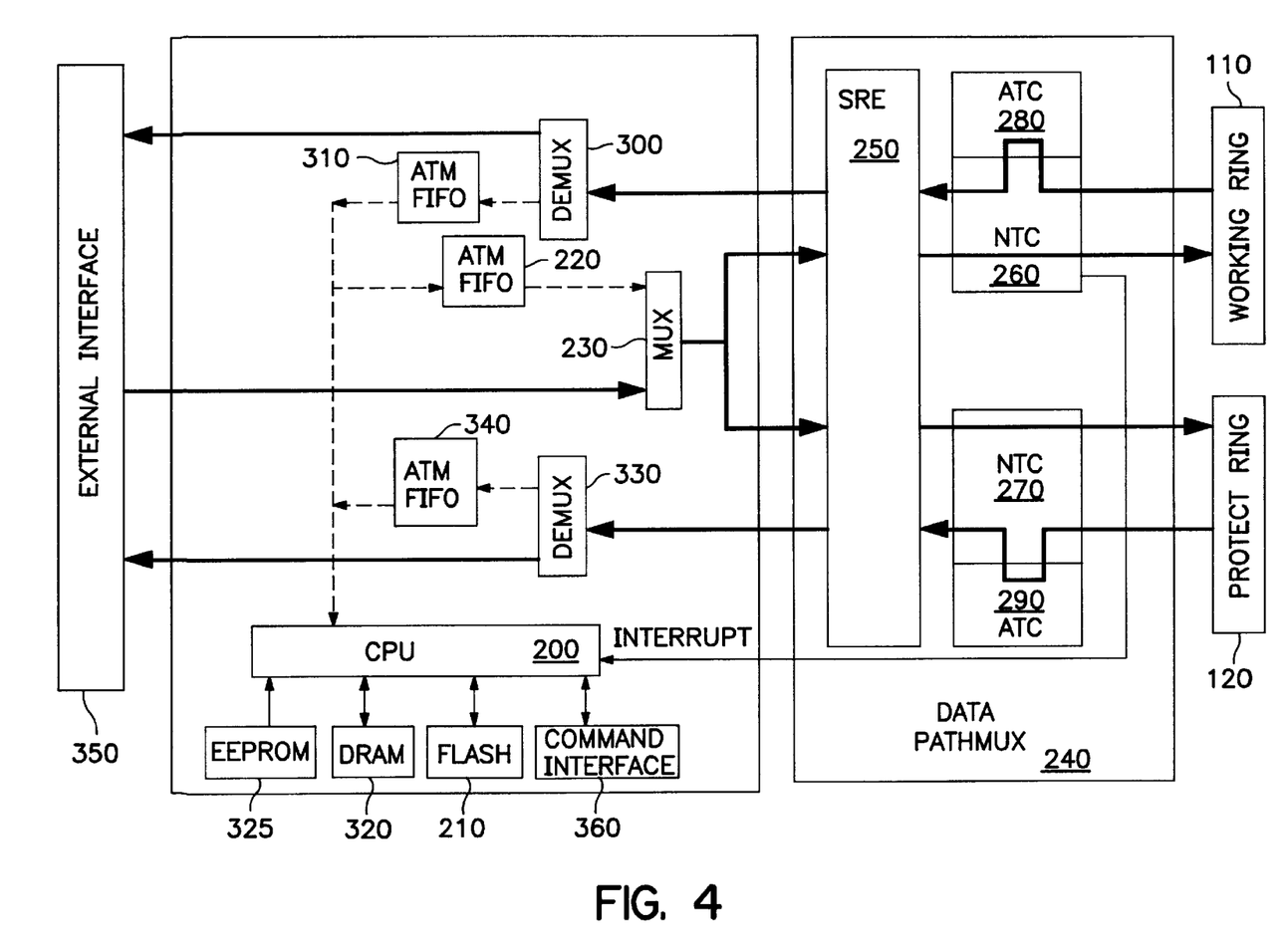
FIG. 4 is a diagram illustrating a node of the present invention.

All the nodes in the SONET are similar to each other in structure and function. The structure and function of node A is described below in detail. However, the structure and function of the other nodes are similar to node A. FIG. 4 shows a more detailed diagram of node A for carrying out the steps shown in FIG. 3. Once node A receives power, an EEPROM 325, storing the program to "boot" node A, activates node A. A CPU 200 directs the flash 210 to send a ring map PDU to the ATM FIFO buffer 220. A flash 220 is a memory unit. The ATM FIFO buffer 220 transmits the ring map PDU to the multiplexer 230. The multiplexer 230 transmits the ring map PDU to a data path multiplexer 240, which egresses the ring map PDU to both the working ring 110 and protection ring 120. The ring map PDU may be in an STS-1 format, for example, for transmission in a reserved virtual channel in both working and protection SONET rings 110 and 120. The data path multiplexer 240 may be a SONET ATM MULTIPLEXER (SAM). The reserved virtual channels may be established using connection identifiers inputted by the command interface 360.

The ring map PDU transmitted in the reserved virtual channel in the working ring 110 is now referred to as the working ring map PDU and the ring map PDU transmitted in the reserved virtual channel in the protection ring 120 is now referred to as the protection ring map PDU. Both of the reserved virtual channels may have the same virtual channel number in the two different rings, for example. The working ring map PDU passes through a self routing switch element (SRE) switch 250 to a network controller (NTC) 260 to egress to the working ring 110. The protection ring map PDU passes through the SRE switch 250 and network controller (NTC) 270 to egress to the protection ring 120.

Node B ingresses the working ring map PDU and adds a TID identifying node B to the working ring map PDU in the working ring 110. Node B then egresses the ring map PDU containing the TID of node B to node C. Node C adds its own TID to the working ring map PDU and egresses the PDU to node D. Node D adds its own TID and egresses the working ring map PDU, which now contains the TID of nodes A, B, C and D, to node A. The working ring map PDU ingresses to the data path MUX 240 of node A.

Node D receives the protection ring map PDU and adds a TID identifying node D to the protection ring map PDU in the protection ring 120. Node D then egresses the protection ring map PDU containing the TID of node D to node C. Node C adds its own TID to the protection ring map PDU and egresses the protection ring map PDU to node B. Node B adds its own TID and egresses the protection ring map PDU, which now contains the TID of nodes A, D, C and B, to node A. The protection ring map PDU ingresses to the data path MUX 240 of node A.

Figure 5:
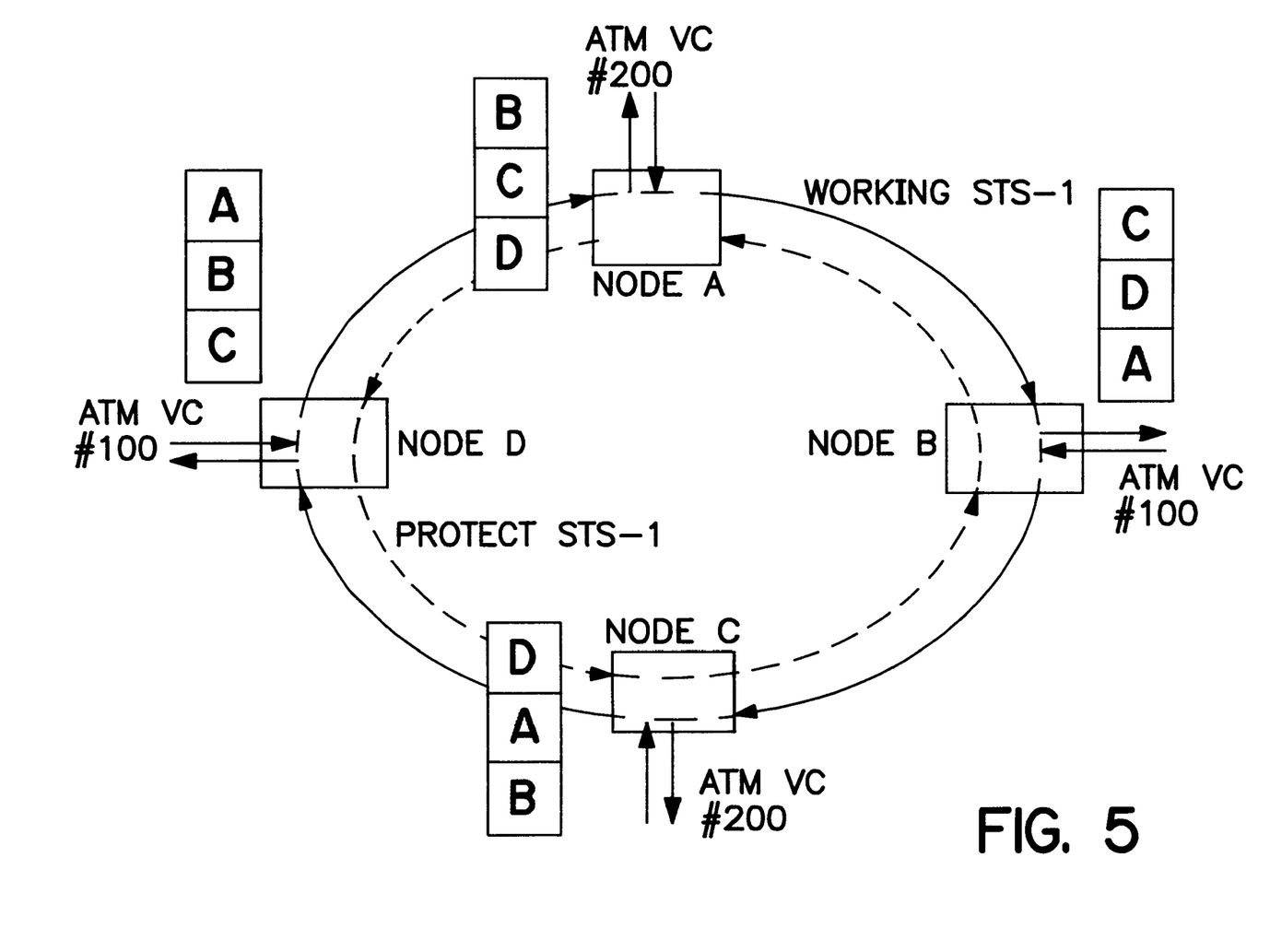
FIG. 5 is an example of topology tables developed by each node by following the steps shown in FIG. 3.

ATC 280 and ATC 290 in the data path multiplexer 240 are ATM translation chips, which provide data for determining whether the working ring map PDU and the protection ring map PDU originated at node A, for example. The network controllers NTC 260 and NTC 270 access data stored in the ATC 280 and ATC 290 respectively in order to determine whether the ring map PDUs originated at node A. If the ring map PDUs did not originate at node A, a TID identifying node A is added to the PDUs and the SRE switch 250 redirects the ring map PDUs through the network controllers NTC 260 and NTC 270 for egressing to the working ring 110 and protection ring 120. However, if the NTC 260 and NTC 270 determine that the ring map PDUs or other data carriers originated at node A, the SRE switch is directed by the network controllers to transmit the working ring map PDU to the CPU 200 by way of the demultiplexer 300 and the ATM FIFO buffer 310 and to ignore the protection ring map PDU. The function of the NTCs 260 and 270 and the ATCs 280 and 290 is described in more detail later in this specification. The CPU 200 determines the location of the neighboring nodes by the location of the TIDs in the working ring map PDU. The CPU 200 develops a topological map of the location of the nodes in the DRAM 320. The topological map developed by each node egressing and ingressing its own ring map PDU is shown in FIG. 5. However, if there is a fiber cut or other transmission media failure, the SRE switch would have been directed by the network controllers 260 and 270 to transmit the protection ring map PDU to the CPU 200 by way of the demultiplexer 330 and ATM FIFO 340.

Even if there had been no media transmission failure such as a fiber cut in the working ring, it is clearly possible to generate the topological table or topological map from the protection ring PDU or from the working ring PDU only.

Further, in FIG. 4, an external interface 350, which generates ATM cells, may be another network such as an ethernet network or a token ring network. The external interface transmits ATM cells to a multiplexer 230, which in turn transmits the ATM cells to the data path multiplexer 240. The external interface 350 egresses ATM cells to the SONET rings 110 and 120 by way of the datapath multiplexer 240. FIG. 4 also shows a command interface 360 for inputting connection identifiers to produce the switch map or switch table discussed below.

Figure 6:
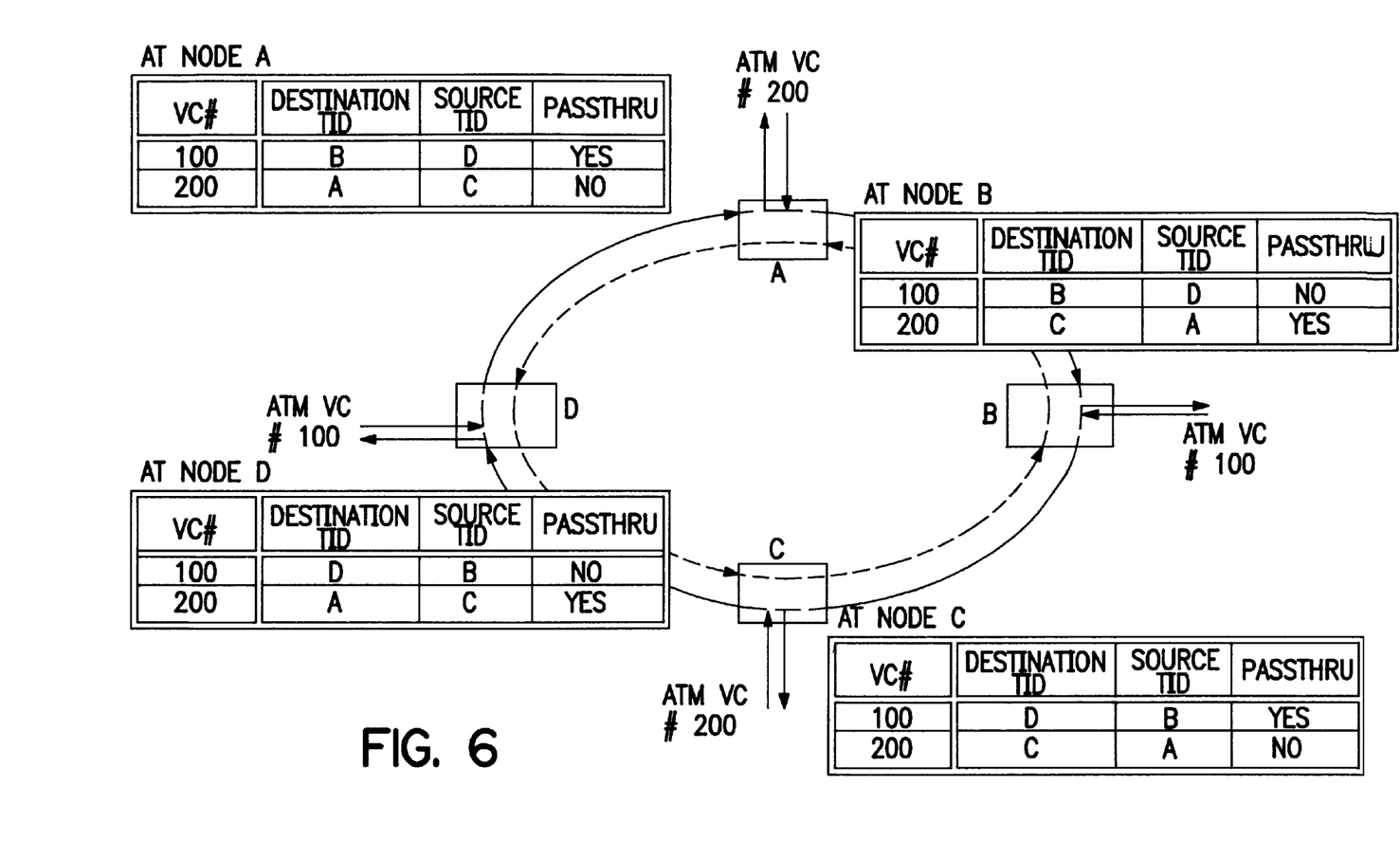
FIG. 6 is a diagram illustrating switch tables (VC configuration tables) of each of the nodes by following the steps shown in FIG. 3.
Figure 9:
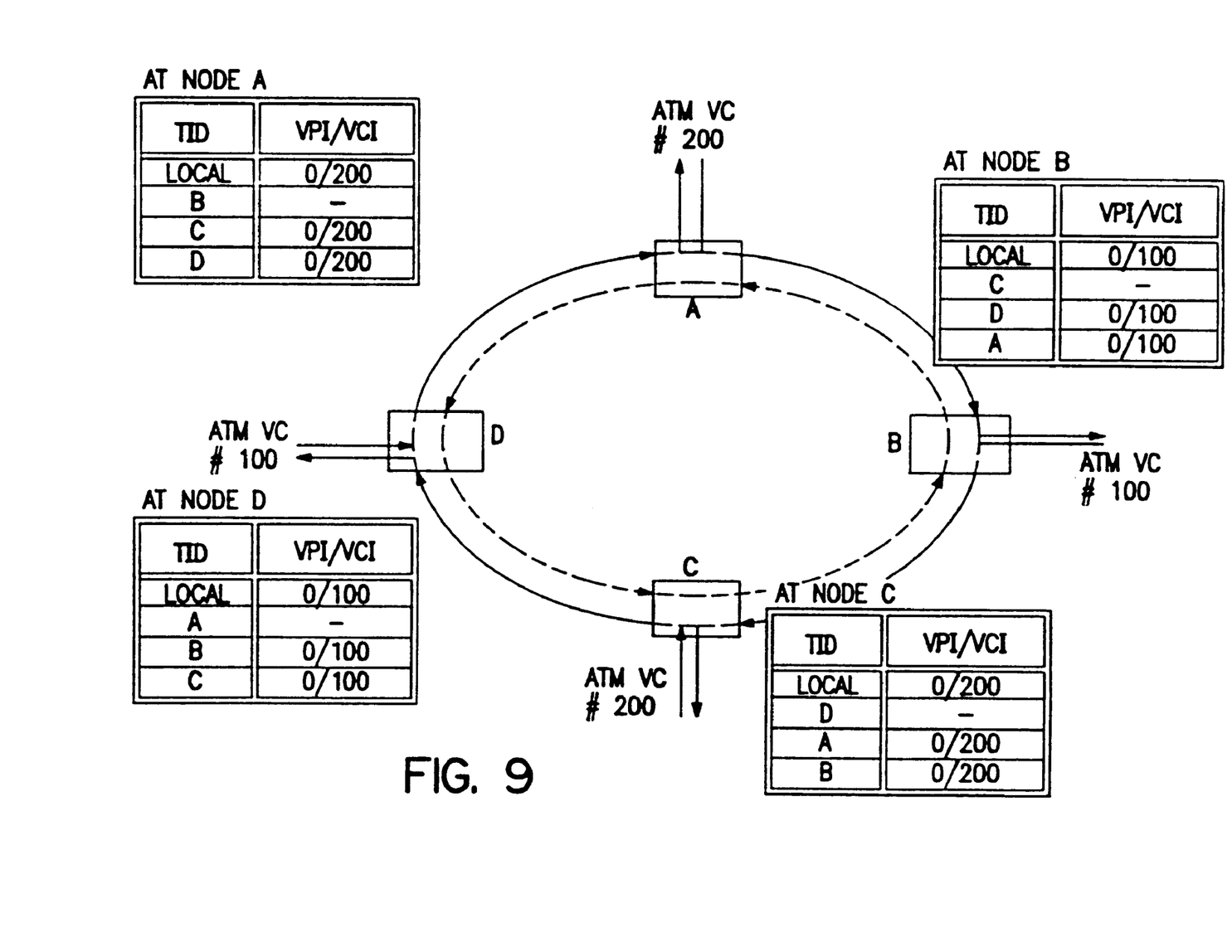
FIG. 9 shows protection ring switch tables (VC configuration tables) of each of the nodes by following the steps shown in FIG. 3.

FIGS. 6 and 9 show a working ring switch table (map) and protection ring switch table (map) at each node, which is generated when the CPU 200 accesses the topological table in the DRAM 320 and the connection identifiers inputted from the command interface 360. For example, suppose a user wishes to utilize a virtual channel to transmit ATM cells between nodes B and D. Each virtual channel is bidirectional and therefore ATM cells may flow from B to D or D to B. In addition, suppose, for example, that a user wishes to utilize a virtual channel to transmit ATM cells between nodes A and C. Again, each virtual channel is bidirectional and therefore ATM cells may flow from A to C or C to A. Further, assume that the user by the way of the command interface 360 assigns virtual channel number 100 to be the virtual channel, which is utilized to transmit ATM cells between nodes B and D. In addition, assume that the user by way of the command interface 360 assigns virtual channel number 200 to be the virtual channel, which is utilized to transmit ATM cells between nodes A and C.

Based upon this information, which is available in the DRAM 320 in each node, the CPU 200 in each node generates a working ring switch map in each node as shown in FIG. 6, for example. The switch maps may be stored in the ATC 280 and accessed by the NTC 260 in each node, for example.

Figure 7:
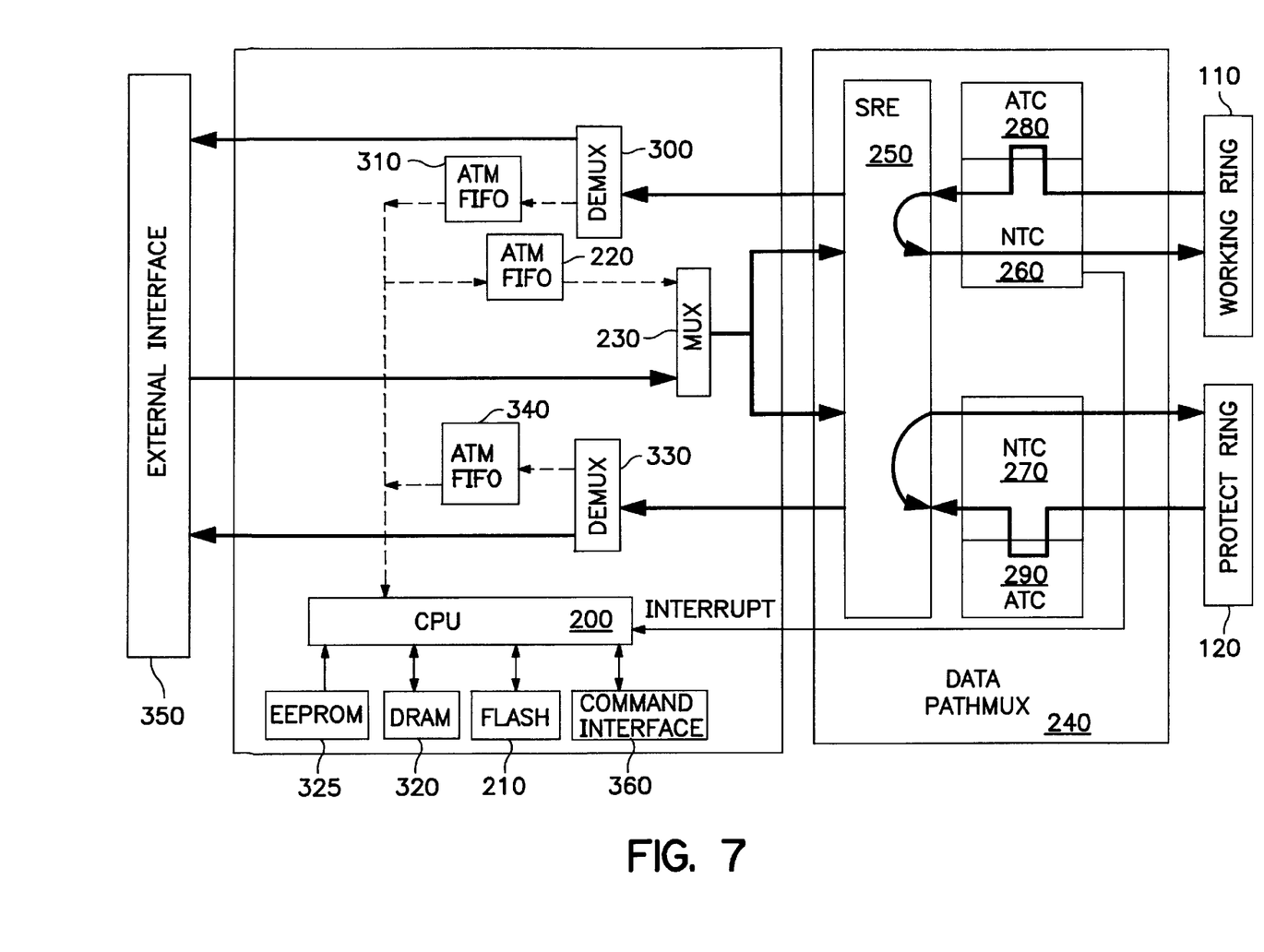
FIG. 7 is a diagram illustrating ATM cells flowing in virtual channels, which pass through a node.

For example, at node A, the working ring switch map indicates that virtual channel 100 has end points B and D, and that ATM cells in virtual channel 100 should pass through node A. Therefore, when the ATM cells flowing through the virtual channel 100 ingress into node A from the working ring 110, the network controller 260 accesses the ATC 280 to determine whether the ATM cells should merely pass through node A or end at node A. Based upon the switch maps in node A, the network controller 260 directs the SRE 250 switch to egress the ATM cells to the working ring 110 as shown in FIG. 7.

The switch maps at node A also indicate that node A is an end point for transmission of ATM cells in virtual channel 200. The other end point is node C. Therefore, when ATM cells from the external interface 350 are to be transmitted from node A to node C in virtual channel 200, node A egresses these ATM cells to both the protection ring 120 and working ring 110 as shown in FIG. 4 by way of multiplexer 230 and data path multiplexer 240. When ATM cells ingress from virtual channel 200 in the working ring 110, the NTC 260 accesses the ATC 280 to determine whether node A is an endpoint. Since the working ring switch map in node A indicates that node A is an endpoint, the NTC 260 directs the SRE 250 to transmit the ATM cells to the external interface 350. The SRE switch 250 will direct the ATM cells along at least one of the paths shown in FIG. 8. The ATM cells may be directed to the external interface 350 by way of the demultiplexer 300. The ATM cells may also be directed to the external interface 350 by way of the demultiplexer 330.

In addition, based upon the topological information, which is available in the DRAM 320 in each node, the CPU 200 in each node generates a protection ring switch map in each node as shown in FIG. 9, for example. The switch maps may be stored in the ATC 290 and accessed by the NTC 270 in each node.

For example, at node A, the switch map indicates that virtual channel 100 has end points B and D, and that ATM cells in virtual channel 100 should pass through node A. Therefore, when the ATM cells flowing through the virtual channel 100 ingress into node A from the protection ring 120, the network controller 270 accesses the ATC 290 to determine whether the ATM cells should merely pass through node A or end at node A. Based upon the protection ring switch map in node A, the network controller 270 directs the SRE 250 switch to egress the ATM cells to the protection ring 120 as shown in FIG. 7.

Figure 8:
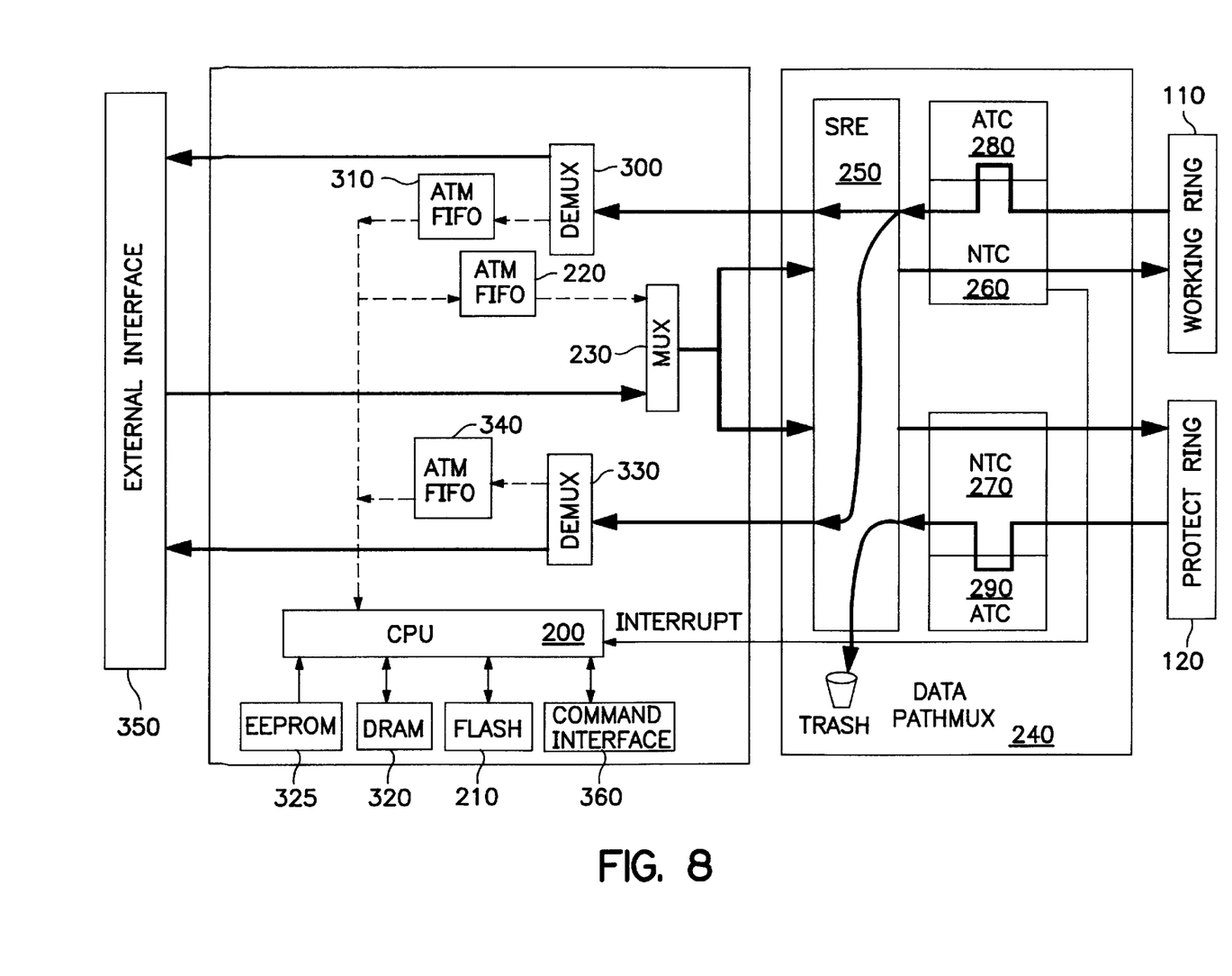
FIG. 8 is a diagram illustrating ATM cells flowing in a node, wherein the node is an endpoint of a virtual channel.

The protection switch map at node A also indicates that node A is an end point for transmission of ATM cells in virtual channel 200. The other end point is node C. Therefore, when ATM cells from the external interface 350 are to be transmitted from node A to node C in virtual channel 200, node A egresses these cells to the protection ring 120 as shown in FIG. 4 by way of multiplexer 230 and data path multiplexer 240. When ATM cells ingress from virtual path 200 in the protection ring 120 to node A, the NTC 270 accesses the ATC 290 to determine whether node A is an endpoint. Since the protection ring switch map in node A indicates that node A is an endpoint, the NTC 270 directs the SRE 250 to delete the ATM cells as shown in FIG. 8.

Although FIG. 6 shows the source node in the switch maps as an embodiment of the present invention, in practice, it is unnecessary to include the source nodes in the switch maps because the switch maps are only used to determine whether ATM cells terminate or pass through the node. The source of the ATM cells is not necessary in making that determination as shown in FIG. 9.

Figure 10:
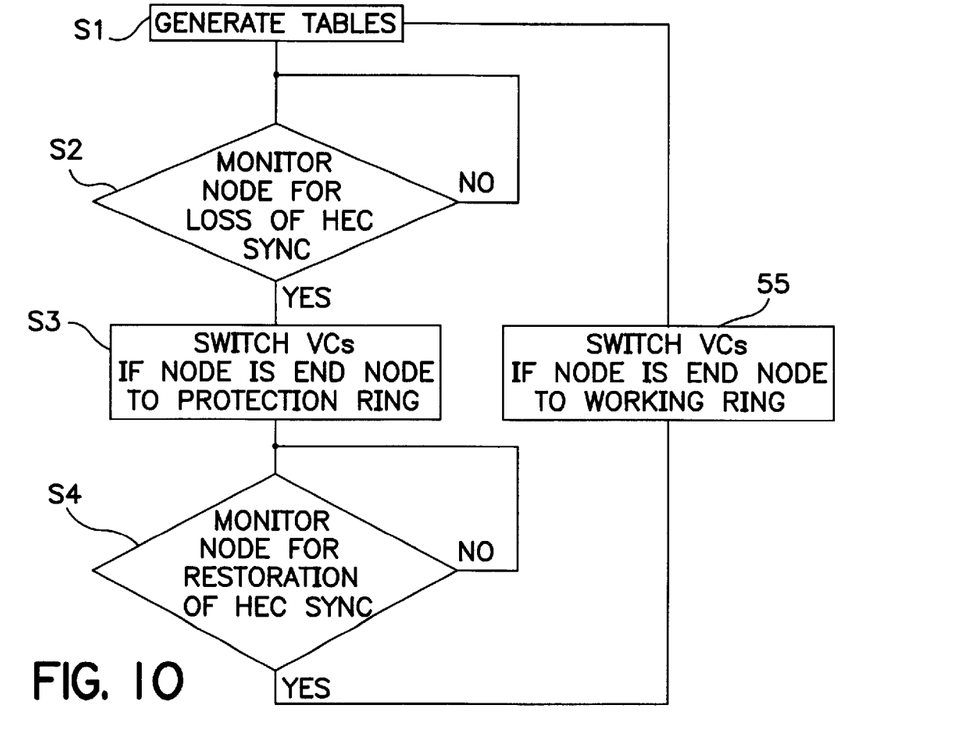
FIG. 10 shows a flow chart of the protection system.

FIG. 10 is a diagram of the protection of a node of the present invention. As discussed above, each node generates a topological table and switch tables (S1). Further, each node repeatedly performs header error check synchronization (HEC SYNC) to determine whether there has been a loss of HEC SYNC (S2). If the node detects HEC SYNC, the node processes ATM cells in the same manner as discussed above. However, if the node detects a loss of HEC SYNC, then the NTC 260 of the data path multiplexer 240 transmits an interrupt to the CPU 200 and the node changes the flow of some of the ATM cells in the node. For example, suppose a virtual channel carrying ATM cells passes through the node detecting the loss of HEC SYNC. These ATM cells would be transmitted through the node in the same manner as discussed above. However, if the node is an endpoint for a virtual channel, the network controller NTC 270 of the protection ring 120 may be directed by the CPU 200 to transmit ATM cells to the external interface. The CPU 200 has directed the data path multiplexer 240 to switch the VCs (S3). The node then continuously monitors the HEC SYNC status to determine whether HEC SYNC has been restored (S4). If HEC SYNC is restored, the CPU 200 directs the data path multiplexer to switch the VCs so that the node receives ATM cells from the working ring 110 (S5). The altering of the flow of ATM cells in the node can be explained by way of the following example.

Figure 11:
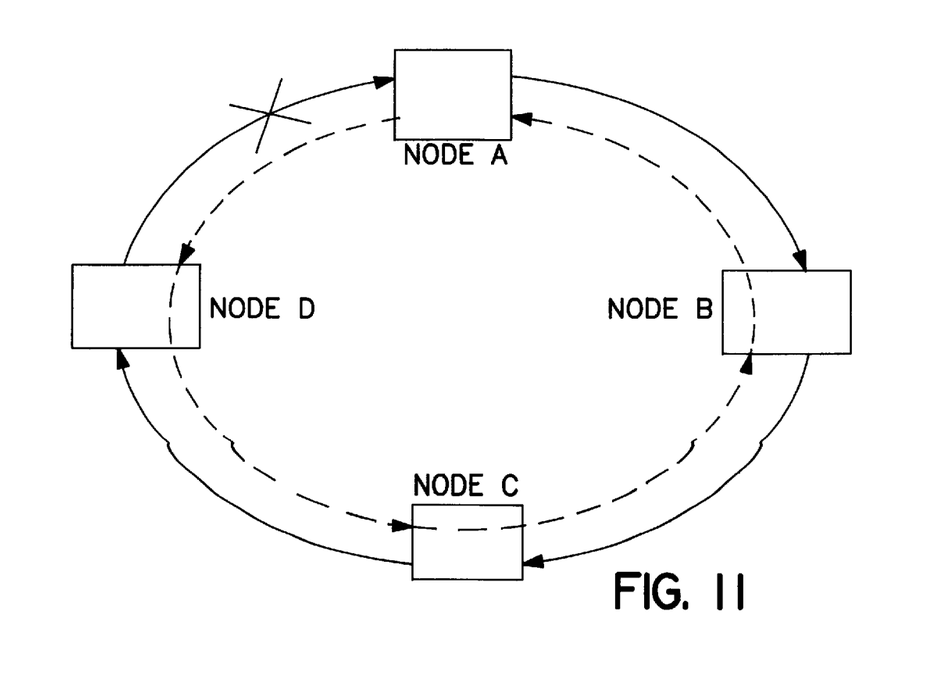
FIG. 11 is a diagram showing a fiber cut in the working ring.

Suppose there is a fiber cut in the working ring 110 as shown in FIG. 11. According to the switch maps stored in the ATCs 280 and 290, the ATM cells flowing through virtual channel 100 in the protection ring 120 will merely continue to pass through node A as shown in FIG. 7. Since there was a fiber cut in the working ring 110, NTC 260 and ATC 280 do not receive any ATM cells to pass through node A. In addition, any ATM cells from an external interface 350 egress onto both the protection ring 120 and working ring 110 of the network.

Figure 12:
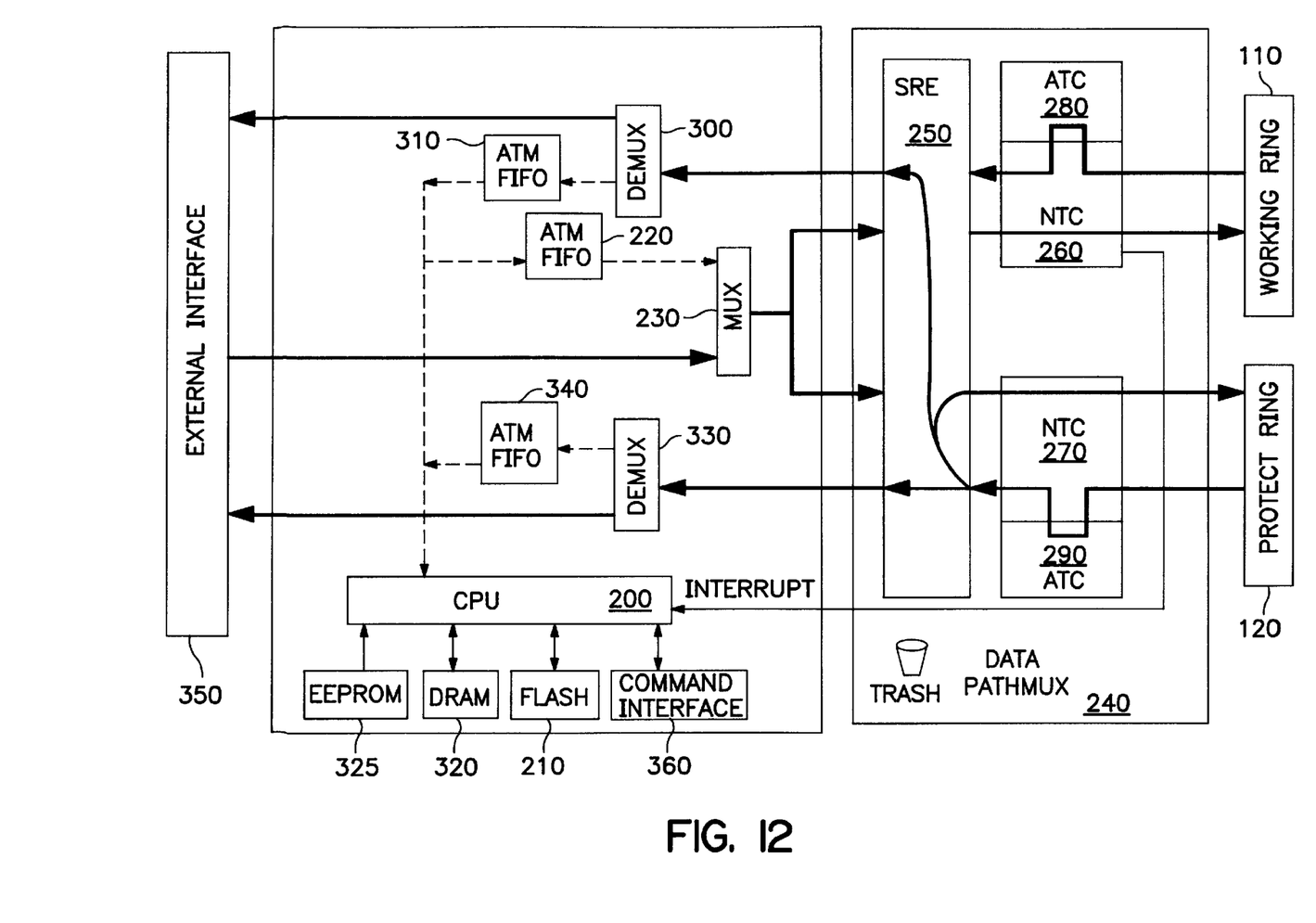
FIG. 12 is a diagram showing the flow of ATM cells in node A after a fiber cut as shown in FIG. 11 has been detected.

However, the ATM cells, which flow between nodes A and C in virtual channel 200, can only be received by way of the protection ring 120 due to the fiber cut in the working ring 110. Therefore, the CPU 200 of Node A instructs the NTC 270 to transmit the ATM cells to the external interface 350. The CPU 200 also instructs NTC 260 not to send ATM cells from virtual channel 100 or virtual channel 200 to the external interface 350. FIG. 12 shows how NTC 270 passes through the ATM cells in virtual channel 100 to the next node and transmits the ATM cells in virtual channel 200 to the external interface 350.

After CPU 200 of node A directs the NTCs 260 and 270 as to how to handle traffic due to the fiber cut, the CPU 200 egresses, to the working ring 110 and protection ring 120, a protection PDU stored in the DRAM 320. The protection PDU notifies other nodes of the HEC SYNC loss detected by node A. The NTCs of each node will interrupt the corresponding CPU, and the CPU will instruct the NTCs based on the NTCs switch maps as to how to handle ATM traffic. For example, since the fiber cut has interrupted ATM cells flowing in the working ring from D to B, node B will direct its NTC 270 to transmit ATM cells in virtual channel 100 from the protection ring 120 to the external interface 350. In this example, nodes C and D are unaffected and can receive ATM cells by way of the working ring 110 as shown in FIG. 8. Therefore, it is not necessary to switch all of the nodes to accept all of ATM cells from the protection ring. Therefore, the problem of the prior art has been solved.

As indicated in FIG. 10, once the HEC SYNC has been lost and the transmission of ATM cells within the node has been changed, node A continuously checks to determine whether HEC SYNC has been restored. If HEC SYNC has not been restored, there is no change in ATM cell flow within the nodes. However, if node A detects restoration of HEC SYNC, the flow of ATM cells directed to the external interface in the ATM node comes from the working ring 110 instead of the protection ring 120. In addition, node A egresses a restoration PDU to notify the other nodes of restoration of HEC SYNC. In the above example, node B would now direct that all ATM cells be transmitted from the working ring 110 to the external interface 350 if node B is the destination of the ATM cells. Finally, node A would begin repeatedly checking for loss of HEC SYNC.

While the invention has been illustrated and described in detail in the drawings and foregoing description, it will be recognized that many changes and modifications will occur to those skilled in the art. It is therefore intended, by the appended claims, to cover any such changes and modifications that fall within the true spirit and scope of the invention.

We claim:

1. An asynchronous transmission mode protection system, in each node of a synchronous optical network, for protecting asynchronous transmission mode cells, comprising:

means for egressing a map payload data unit, having a node identifier of an originating node, from the originating node to a plurality of neighboring nodes;

means for ingressing at a neighboring node the map payload data unit having at least the node identifier of the originating node, for adding a node identifier of the neighboring node to the map payload data unit, and for egressing the map payload data unit;

means for ingressing at the originating node the map payload data unit having the node identifiers of the originating node and at least one neighboring node, and extracting the node identifier for each neighboring node from the map payload data unit;

means for generating a topology table based upon the node identifiers; and means for detecting a loss of header error check synchronization (HEC SYNC), generating and egressing a protection payload data unit identifying the node detecting the loss.

2. An asynchronous transmission mode protection system as claimed in claim 1, further comprising:

means for detecting the restoration of header error check synchronization, and for generating a restoration payload data unit identifying the node detecting restoration.

3. An asynchronous transmission mode protection system as claimed in claim 1, wherein the neighboring node ingresses the map payload data unit and determines if the map payload data unit has the node identifier of the neighboring node, the neighboring node adding the node identifier of the neighboring node and egressing the map payload data unit only if the map payload data unit does not have the node identifier of the neighboring node.

4. An asynchronous transmission mode protection system as claimed in claim 1, wherein the topology table is periodically updated.

5. An asynchronous transmission mode protection system as claimed in claim 1, wherein the node identifiers are added to the map payload data unit in an order and the topology table is generated based on the order of the node identifiers in the map payload data unit.

6. A method for protecting, in a node of a synchronous optical network, asynchronous transmission cells, the method comprising the steps of:

egressing a map payload data unit, having a node identifier of an originating node, from the originating node to a plurality of neighboring nodes;

ingressing at a neighboring node, the map payload data unit having at least the node identifier of the originating node, adding a node identifier of the neighboring node to the map payload data unit, and egressing the map payload data unit;

ingressing at the originating node the map payload data unit having the node identifiers of the originating node and at least one neighboring node and extracting the node identifier for each neighboring node;

generating a topology table based upon the node identifiers; and detecting a loss of header error check synchronization, generating a protection payload data unit identifying the node detecting the loss, and egressing the protection payload data unit.

7. A method for protecting asynchronous transmission mode cells as claimed in claim 6, further comprising the steps of:

detecting a restoration of header error check synchronization; and generating a restoration payload data unit.

8. A method for protecting asynchronous transmission mode cells according to claim 6, wherein the neighboring node ingresses the map payload data unit and determines if the map payload data unit has the node identifier of the neighboring node, the neighboring node adding the node identifier of the neighboring node and egressing the map payload data unit only if the map payload data unit does not have the node identifier of the neighboring node.

9. A method for protecting asynchronous transmission mode cells according to claim 6, wherein the node identifiers are added to the map payload data unit in an order and the topology table is generated based on the order of the node identifiers in the map payload data unit.

10. An asynchronous transmission mode protection system, in a synchronous optical network having cells travelling between nodes on first and second set of links, comprising:

means for egressing a map payload data unit, having a node identifier of a protected node, from the protected node to a plurality of neighboring nodes;

means for ingressing at a neighboring node, the map payload data unit having at least the node identifier of the protected node, for adding a node identifier of the neighboring node to the map payload data unit, and for egressing the map payload data unit;

means for ingressing at the protected node, the map payload data unit having node identifiers of the protected node and at least one neighboring node and extracting the node identifier for each neighboring node;

means for identifying cells leaving the network at protected node;

means for detecting asynchronous headers in cells travelling on the first set of links; and means, activated if asynchronous headers are detected, for switching the source of cells leaving the network at the protected node from the first set of links to the second set of links while allowing cells not leaving the network at the protected node to travel on the first set of links.

11. An asynchronous transmission mode protection system as claimed in claim 10 further comprising:

means for detecting the restoration of synchronous headers in the first set of links, and for switching the source of cells leaving at the protected node from the second set of links to the first set of links.

12. An asynchronous transmission mode protection system as claimed in claim 10, wherein the neighboring node ingresses the map payload data unit and determines if the map payload data unit has the node identifier of the neighboring node, the neighboring node adding the node identifier of the neighboring node and egressing the map payload data unit only if the map payload data unit does not have the node identifier of the neighboring node.

13. An asynchronous transmission mode protection system as claimed in claim 10, further comprising means for generating a topology table based on the node identifiers.

14. An asynchronous transmission mode protection system as claimed in claim 13, wherein the topology table is periodically updated.

15. An asynchronous transmission mode protection system as claimed in claim 13, wherein the node identifiers are added to the map payload data unit in an order and the topology table is generated based on the order of the node identifiers in the map payload data unit.

16. An asynchronous transmission mode protection system as claimed in claim 13, wherein the means for detecting egresses a protection payload data unit identifying the node detecting the asynchronous headers, the system further comprising means for determining the source node for cells leaving at the protected node and switching the source of cells leaving at the protected node from the first set of links to the second set of links only if the source node is downstream from the node detecting the asynchronous headers in the first set of links.

17. An asynchronous transmission mode protection system as claimed in claim 10, wherein the first set of links is a working ring and the second set of links is a protection ring.

18. An asynchronous transmission mode protection system as claimed in claim 10, wherein a protection payload data unit is generated and egressed up on detecting asynchronous headers.

19. An asynchronous transmission mode protection system as claimed in claim 18, further comprising means for detecting the restoration of synchronous headers in the first set of links, for generating and egressing a restoration payload data unit and for switching the source of cells leaving the protected node from the second set of links to the first set of links.

20. An asynchronous transmission mode protection system as claimed in claim 10, wherein map payload data units are egressed over the first and second sets of links.

21. An asynchronous transmission mode protection system as claimed in claim 20, further comprising means for generating a topology table for both the first and second set of links, based on the node identifiers in the map payload data units egressed over the first and second sets of links.

22. An asynchronous transmission mode protection system as claimed in claim 10, further comprising means for transmitting data cells over both the first and second set of links.

23. An asynchronous transmission mode protection system as claimed in claim 10, wherein the protection system protects all nodes of the network.

24. A protection system for a protected node in a network having cells travelling between nodes on first and second sets of links, comprising:

an identifier to identify cells leaving the network at the protected node;

a detector to identify a problem link of the first set of links; and a channeler, operable if the detector identifies a problem link, to switch the source of cells leaving the network at the protected node from the first set of links to the second set of links while allowing cells not leaving the network at the protected node to pass through the protected node on the first set of links.

25. A protection system according to claim 24, further comprising a mapping unit to map the topology of the first set of links, wherein:
   the identifier determines, based on the topology of the first set of links, which links of the first set of links are traversed by the cells leaving at the protected node, and
   the channeler switches the source of the cells leaving at the protected node from the first set of links to the second set of links, only if the cells leaving at the protected node traverse the problem link.

26. A protection system according to claim 25, wherein the identifier determines which links of the first set of links are traversed by the cells leaving at the protected node based on the topology of the first set of links and based on the identity of a source node for cells leaving at the protected node.

27. A protection system according to claim 25, wherein the mapping unit maps the topology of both the first and second sets of links.

28. A protection system according to claim 24, further comprising a transmitter to transmit data cells over both the first and second sets of links.

29. A protection system according to claim 24, wherein each node of the network has an identifier, a detector and a channeler.

30. A method for protecting a protected node in a network having cells travelling between nodes on first and second sets of links, comprising the steps of:
   (a) identifying cells leaving the network at the protected node;
   (b) identifying a problem link of the first set of links; and
   (c) switching, if a problem link is identified, the source of cells leaving the network at the protected node from the first set of links to the second set of links while allowing cells not leaving the network at the protected node to pass through the protected node on the first set of links.

31. A method for protecting according to claim 30, further comprising the steps of:
   mapping the topology of the first set of links,
   identifying based on the topology of the first set of links, which links of the first set of links are traversed by the cells leaving at the protected node,
   wherein the source of the cells leaving at the protected node are switched from the first set of links to the second set of links, only if the cells leaving at the protected node traverse the problem link.

32. A method for protecting according to claim 31, wherein the links of the first set of links traversed by the cells leaving at the protected node are identified based on the topology of the first set of links and based on the identity of a source node for cells leaving at the protected node.

33. A method for protecting according to claim 31, where in the topology of both the first and second sets of links is mapped.

34. A method for protecting according to claim 30, further the step of transmitting data cells over both the first and second sets of links.

* * * * *

UNITED STATES PATENT AND TRADEMARK OFFICE
CERTIFICATE OF CORRECTION

PATENT NO. : 5,949,755
DATED : September 7, 1999
INVENTOR(S) : Nagaraja Upadhya et al.

It is certified that error appears in the above-identified patent and that said Letters Patent is hereby corrected as shown below:

<u>Title page,</u>
Item [75], Inventor(s), change first inventor's last name from "Uphadya" to
-- Upadhya --.

Signed and Sealed this

Thirtieth Day of September, 2003

JAMES E. ROGAN
*Director of the United States Patent and Trademark Office*